(12) United States Patent
Davis et al.

(10) Patent No.: US 9,043,446 B1
(45) Date of Patent: May 26, 2015

(54) MIRRORING DEVICE INTERFACE COMPONENTS FOR CONTENT SHARING

(75) Inventors: John Mark Davis, Leawood, KS (US); Daniel L. Dryden, Olathe, KS (US); Michael P. McMullen, Leawood, KS (US); Sei Y. Ng, Olathe, KS (US); Susan J. Pennington, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1057 days.

(21) Appl. No.: 13/045,292

(22) Filed: Mar. 10, 2011

(51) Int. Cl.
  *G06F 15/177* (2006.01)
  *G06F 3/048* (2013.01)
  *H04L 29/06* (2006.01)

(52) U.S. Cl.
  CPC .............. *G06F 3/048* (2013.01); *H04L 65/403* (2013.01)

(58) Field of Classification Search
  CPC ... H04L 63/102; H04L 65/403; H04L 67/125; H04L 67/18; H04L 67/306; G06F 21/6245; G06F 3/048
  USPC .................................. 709/224, 204, 220, 222
  See application file for complete search history.

(56) References Cited

U.S. PATENT DOCUMENTS

| | | | |
|---|---|---|---|
| 5,732,216 A | 3/1998 | Logan et al. | |
| 5,950,200 A * | 9/1999 | Sudai et al. | 1/1 |
| 6,064,975 A | 5/2000 | Moon et al. | |
| 6,186,553 B1 | 2/2001 | Phillips et al. | |
| 6,356,838 B1 | 3/2002 | Paul | |
| 6,622,016 B1 | 9/2003 | Sladek et al. | |
| 6,647,260 B2 | 11/2003 | Dusse et al. | |
| 6,978,132 B1 | 12/2005 | Sladek et al. | |
| 6,986,107 B2 | 1/2006 | Hanggie et al. | |
| 7,031,437 B1 | 4/2006 | Parsons et al. | |
| 7,072,653 B1 | 7/2006 | Sladek et al. | |
| 7,073,130 B2 | 7/2006 | Novak et al. | |
| 7,215,754 B1 | 5/2007 | Woodson et al. | |
| 7,260,382 B1 | 8/2007 | Lamb et al. | |

(Continued)

FOREIGN PATENT DOCUMENTS

| | | |
|---|---|---|
| WO | 2009056148 A1 | 5/2009 |
| WO | 2014022446 A1 | 2/2014 |

OTHER PUBLICATIONS

Foreign Communication From a Related Counterpart Application—International Search Report and Written Opinion, PCT/US2013/052805 Oct. 4, 2013.

(Continued)

*Primary Examiner* — Oleg Survillo

(57) ABSTRACT

A system is provided comprising processor, memory, and monitoring application that receives a first communication from a first portable electronic device containing a description of an ID of the first portable device, the ID comprising at least one of applications, media files, and widgets. The system creates a file mirroring the ID and receives a second communication containing a first plurality of entries to the ID associated with interactions with at least a first remote device. The system stores the first plurality of entries in the file and receives a third communication containing a first plurality of communications received by the first portable device, the first plurality of communications associated with the interactions. The system stores the first plurality of communications and sends a fourth communication to a second remote device providing the first plurality of entries and the first plurality of communications associated with the interactions.

18 Claims, 6 Drawing Sheets

(56) References Cited

U.S. PATENT DOCUMENTS

| | | |
|---|---|---|
| 7,260,386 B1 | 8/2007 | Haldar et al. |
| 7,500,198 B2 | 3/2009 | Mathews et al. |
| 7,558,953 B2 | 7/2009 | Osthoff et al. |
| 7,702,322 B1 | 4/2010 | Maurya et al. |
| 7,930,636 B2 | 4/2011 | Garbow et al. |
| 7,970,386 B2 | 6/2011 | Bhat et al. |
| 8,012,219 B2 | 9/2011 | Mendez et al. |
| 8,150,962 B1 | 4/2012 | Wolter |
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,315,198 B2 | 11/2012 | Corneille et al. |
| 8,359,016 B2 | 1/2013 | Lindeman et al. |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,583,091 B1 | 11/2013 | Delker et al. |
| 8,589,911 B1 | 11/2013 | Sharkey et al. |
| 8,838,087 B1 | 9/2014 | Delker et al. |
| 8,843,122 B1 | 9/2014 | Wick et al. |
| 8,954,041 B1 | 2/2015 | Delker et al. |
| 2002/0029169 A1 | 3/2002 | Oki et al. |
| 2002/0054086 A1 | 5/2002 | Van Oostenbrugge et al. |
| 2002/0054150 A1 | 5/2002 | I'Anson et al. |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0167542 A1 | 11/2002 | Florin |
| 2003/0233329 A1 | 12/2003 | Laraki et al. |
| 2004/0044752 A1 | 3/2004 | Hamaguchi et al. |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0203941 A1 | 10/2004 | Kaplan et al. |
| 2004/0216054 A1 | 10/2004 | Mathews et al. |
| 2005/0050474 A1 | 3/2005 | Bells et al. |
| 2005/0071780 A1 | 3/2005 | Muller et al. |
| 2005/0085272 A1 | 4/2005 | Anderson et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0190569 A1 | 8/2006 | Neil et al. |
| 2006/0258289 A1 | 11/2006 | Dua |
| 2006/0277469 A1 | 12/2006 | Chaudhri et al. |
| 2007/0067738 A1 | 3/2007 | Flynt et al. |
| 2007/0088851 A1 | 4/2007 | Levkovitz et al. |
| 2007/0109580 A1 | 5/2007 | Yoshida |
| 2007/0130156 A1 | 6/2007 | U. Tenhunen et al. |
| 2007/0265023 A1 | 11/2007 | Bengtsson et al. |
| 2007/0268842 A1 | 11/2007 | Wang |
| 2007/0282914 A1 | 12/2007 | Sivapragasam et al. |
| 2008/0010133 A1 | 1/2008 | Pyhalammi et al. |
| 2008/0034309 A1 | 2/2008 | Louch et al. |
| 2008/0092057 A1 | 4/2008 | Monson et al. |
| 2008/0192714 A1 | 8/2008 | Kim et al. |
| 2008/0214172 A1 | 9/2008 | Anwer |
| 2008/0276182 A1* | 11/2008 | Leow ............................ 715/740 |
| 2008/0305775 A1 | 12/2008 | Aaltonen et al. |
| 2008/0319887 A1 | 12/2008 | Pizzi et al. |
| 2009/0017870 A1 | 1/2009 | An |
| 2009/0077495 A1 | 3/2009 | Bhat et al. |
| 2009/0181716 A1 | 7/2009 | Benco et al. |
| 2009/0186651 A1 | 7/2009 | You |
| 2009/0228824 A1 | 9/2009 | Forstall et al. |
| 2009/0254753 A1 | 10/2009 | De Atley et al. |
| 2009/0260004 A1 | 10/2009 | Datta et al. |
| 2009/0291674 A1 | 11/2009 | Choi |
| 2009/0307679 A1 | 12/2009 | Lee et al. |
| 2010/0005196 A1 | 1/2010 | Wolff-Petersen |
| 2010/0030901 A1 | 2/2010 | Hallberg et al. |
| 2010/0060549 A1 | 3/2010 | Tsern |
| 2010/0087175 A1 | 4/2010 | Roundtree |
| 2010/0115438 A1 | 5/2010 | Chu |
| 2010/0184422 A1 | 7/2010 | Ahrens |
| 2010/0190478 A1 | 7/2010 | Brewer et al. |
| 2010/0197219 A1 | 8/2010 | Issa et al. |
| 2010/0234051 A1 | 9/2010 | Holden et al. |
| 2010/0281427 A1 | 11/2010 | Ghosh et al. |
| 2011/0072121 A1 | 3/2011 | Takasugi et al. |
| 2011/0161149 A1 | 6/2011 | Kaplan |
| 2011/0161484 A1 | 6/2011 | Van den Bogaert et al. |
| 2011/0210933 A1 | 9/2011 | Forstall |
| 2011/0238496 A1 | 9/2011 | Gurbuxani et al. |
| 2011/0295980 A1 | 12/2011 | Aldis et al. |
| 2011/0314389 A1 | 12/2011 | Meredith et al. |
| 2012/0016735 A1 | 1/2012 | Park et al. |
| 2012/0102428 A1 | 4/2012 | Stewart |
| 2012/0102547 A1 | 4/2012 | Fransdonk |
| 2012/0117478 A1 | 5/2012 | Vadde et al. |
| 2012/0155292 A1 | 6/2012 | Zazula et al. |
| 2013/0097654 A1 | 4/2013 | Aciicmez et al. |
| 2013/0275915 A1 | 10/2013 | Wang |
| 2014/0036697 A1 | 2/2014 | Annan et al. |
| 2014/0047559 A1* | 2/2014 | Vera et al. ...................... 726/28 |
| 2014/0127662 A1* | 5/2014 | Kron et al. .................... 434/262 |
| 2014/0173462 A1* | 6/2014 | Mattingly et al. ............ 715/753 |

OTHER PUBLICATIONS

Advisory Action dated Aug. 6, 2013, U.S. Appl. No. 13/018,083, filed Jan. 31, 2011.

Final Office Action dated Sep. 10, 2013, U.S. Appl. No. 13/118,058, filed May 27, 2011.

Office Action—Restriction Requirement dated Aug. 26, 2013, U.S. Appl. No. 13/031,123, filed Feb. 8, 2011.

Delker, Jason R., et al., Patent Application entitled "System and Method for ID Platform," filed Sep. 5, 2013, U.S. Appl. No. 14/019,053.

Delker, Jason R., et al., Patent Application entitled "Dynamic Loading, Unloading, and Caching of Alternate Complete Interfaces," filed Sep. 30, 2013, U.S. Appl. No. 14/042,707.

Annan, Brandon C., et al., International Application entitled, "Traffic Management of Third Party Applications", filed Jul. 24, 2013, U.S. Appl. No. PCT/US13/52805.

Annan, Brandon C., et al., Patent Application entitled, "Traffic Management of Third Party Applications", filed Jul. 31, 2012, U.S. Appl. No. 13/563,709.

FAIPP Office Action dated Jan. 24, 2014, U.S. Appl. No. 12/876,220, filed Sep. 6, 2010.

Office Action dated Dec. 26, 2013, U.S. Appl. No. 13/018,083, filed Jan. 31, 2011.

Advisory Action dated Nov. 22, 2013, U.S. Appl. No. 13/118,058, filed May 27, 2011.

Office Action dated Dec. 17, 2013, U.S. Appl. No. 13/031,123, filed Feb. 18, 2011.

Office Action—Restriction Requirement dated Feb. 1, 2012, U.S. Appl. No. 12/876,221, filed Sep. 6, 2010.

Pre-Interview Communication dated Feb. 26, 2013, U.S. Appl. No. 13/023,486, filed Feb. 8, 2011.

Final Office Action dated Jan. 11, 2013, U.S. Appl. No. 12/876,221, filed Sep. 6, 2010.

Pre-Interview Communication dated Feb. 26, 2013, U.S. Appl. No. 13/118,058, filed May 27, 2011.

Office Action dated Mar. 14, 2013, U.S. Appl. No. 13/161,496, filed Jun. 16, 2011.

Delker, Jason R., et al., Patent Application entitled "Transition Experience During Loading and Updating an Interface and Applications Pack," filed Oct. 24, 2012, U.S. Appl. No. 13/659,889.

Ackerman, Samuel K., "Lecture Slides: Mapping User Interface Design to Culture Dimensions", Aaron Marcus and Associates, Inc., 2001.

Kenja's Newsletter, About Newsletter, http://kenja.net/news.main.html, printed from the World Wide Web, last modified Fri, Oct. 10, 2003.

Openwave, "Comparison of WAP Push and Short Message Service (SMS)," Openwave Systems, Inc., Redwood City, CA, Apr. 2002.

Qualcomm, uiOne™, http://brew.qualcomm.com/brew/in/about/uione.html.

(56) References Cited

OTHER PUBLICATIONS

Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Apr. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2009, U.S. Appl. No. 11/333,964, filed Jan. 17, 2006.
Advisory Action dated Apr. 13, 2009, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Wolter, Eric S., Patent Application entitled "Method and System for Delivery of User-Interface Skins, Applications, and Services to Wireless Devices," filed Jan. 17, 2006, U.S. Appl. No. 11/333,964.
Katzer, Robin Dale, et al., Patent Application entitled "Zone Architecture for Dynamic Targeted Content Creation," filed Oct. 11, 2011, U.S. Appl. No. 13/271,207.
FAIPP Pre-Interview Communication dated Jul. 19, 2012, U.S. Appl. No. 13/018,083, filed Jan. 31, 2011.
Cha, Tae-Woo, et al., Patent Application entitled, "Device Experience Adaptation Based on Schedules and Events," filed Jun. 29, 2012, U.S. Appl. No. 13/537,563.
Notice of Allowance dated Jun. 4, 2013, U.S. Appl. No. 13/023,486, filed Feb. 8, 2011.
Advisory Action dated Apr. 23, 2013, U.S. Appl. No. 12/876,221, filed Sep. 6, 2010.
Notice of Allowance dated Jul. 2, 2013, U.S. Appl. No. 12/876,221, filed Sep. 6, 2010.
Final Office Action dated May 10, 2013 U.S. Appl. No. 13/018,083, filed Jan. 31, 2011.
First Action Interview Office Action dated May 6, 2013, U.S. Appl. No. 13/118,058, filed May 27, 2011.
Notice of Allowance dated Apr. 29, 2013, U.S. Appl. No. 13/537,563, filed Jun. 29, 2012.
Notice of Allowance dated Jun. 27, 2013, U.S. Appl. No. 13/161,496, filed Jun. 16, 2011.
Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.
Delker, Jason R., et al., Patent Application entitled "Provisioning System and Methods for Interfaceless Phone," filed Sep. 6, 2010, U.S. Appl. No. 12/876,220.
Delker, Jason R., et al., Patent Application entitled "System and Method for ID Platform," filed Feb. 8, 2011, U.S. Appl. No. 13/023,486.
Delker, Jason R., et al., Patent Application entitled "Dynamic Loading, Unloading, and Caching of Alternate Complete Interfaces," filed Sep. 6, 2010, U.S. Appl. No. 12/876,221.
Delker, Jason R., et al., Patent Application entitled "Shared ID with Second Party," filed Jan. 31, 2011, U.S. Appl. No. 13/018,083.
Delker, Jason R., et al., Patent Application entitled "Extending ID to a Computer System," filed May 27, 2011, U.S. Appl. No. 13/118,058.
Cha, Tae-Woo, et al., Patent Application entitled "Device Experience Adaptation Based on Schedules and Events," filed Feb. 16, 2011, U.S. Appl. No. 13/029,103.
Smith, Nathan A., et al., Patent Application entitled "Restricted Testing Access for Electronic Device," filed Jun. 16, 2011, U.S. Appl. No. 13/161,496.
Delker, Jason R., et al., Patent Application entitled "Ad Sponsored Communication Pack," filed Feb. 18, 2011, U.S. Appl. No. 13/031,123.
First Action Interview Pre-Interview Communication dated Apr. 24, 2012, U.S. Appl. No. 12/876,220, filed Sep. 6, 2010.
FAIPP Office Action dated May 10, 2012, U.S. Appl. No. 12/876,221, filed Sep. 6, 2010.
Notice of Allowance dated Mar. 30, 2012, U.S. Appl. No. 13/029,103, filed Feb. 16, 2011.
Final Office Action dated Mar. 20, 2014, U.S. Appl. No. 12/876,220, filed Sep. 6, 2010.
Notice of Allowance dated May 6, 2014, U.S. Appl. No. 12/876,220, filed Sep. 6, 2010.
Pre-Interview Communication dated Mar. 28, 2014, U.S. Appl. No. 14/019,053, filed Sep. 5, 2013.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Mar. 18, 2014, U.S. Appl. No. 13/118,058, filed May 27, 2011.
Pre-Interview Communication dated Jun. 9, 2014, U.S. Appl. No. 13/271,207, filed Oct. 11, 2011.
Pre-Interview Communication dated Mar. 21, 2014, U.S. Appl. No. 13/537,610, filed Jun. 29, 2012.
Notice of Allowance dated May 18, 2014, U.S. Appl. No. 13/537,610, filed Jun. 29, 2012.
Wick, Ryan A., et al., Patent Application entitled "Mobile Phone Controls Preprocessor" filed on Jun. 29, 2012, U.S. Appl. No. 13/537,610.
Notice of Allowance dated Aug. 13, 2014, U.S. Appl. No. 14/019,053, filed Sep. 5, 2013.
Office Action dated Sep. 23, 2014, U.S. Appl. No. 13/018,083, filed Jan. 31, 2011.
Notice of Allowance dated Oct. 22, 2014, U.S. Appl. No. 13/118,058, filed May 27, 2011.
Pre-Interview Communication dated Aug. 8, 2014, U.S. Appl. No. 13/659,889, filed Oct. 24, 2012.
First Action Interview dated Oct. 15, 2014, U.S. Appl. No. 13/659,889, filed Oct. 24, 2012.
Office Action dated Oct. 10, 2014, U.S. Appl. No. 13/031,123, filed Feb. 18, 2011.
Wick, Ryan A., et al., Patent Application entitled "Mobile Phone Controls Preprocessor" filed Sep. 3, 2014, U.S. Appl. No. 14/476,339.
Foreign Communication From a Related Counterpart Application —International Preliminary Report on Patentability dated Feb. 12, 2015, PCT/US2013/052805 filed on Jul. 24, 2013.
Supplemental Notice of Allowance dated Dec. 3, 2014, U.S. Appl. No. 13/118,058, filed May 27, 2011.
Office Action dated Dec. 17, 2014, U.S. Appl. No. 13/563,709, filed Jul. 31, 2012.
Faipp Office Action dated Dec. 2, 2014, U.S. Appl. No. 13/271,207, filed Oct. 11, 2011.

\* cited by examiner

MIRRORING DEVICE INTERFACE COMPONENTS FOR CONTENT SHARING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An effective user interface for a mobile device may be readily understood and provide the user a sense of comfort and control. Users may see the range of their choices, understand how to accomplish their objectives, and complete their tasks. The user interface may relieve the user from performing trivial tasks. Work done by the device may be continuously saved, with a full option for the user to undo any activity at any time. A well designed user interface may feature applications and services that perform an increased quantity of work, while requiring a reduced quantity of input from the user. Interface applications may attempt to anticipate the wants and needs of the user. The user may be relieved of tasks comprising searching for or gathering information or locating tools. A well designed interface may deliver the information and tools needed for each step of the process to the user. The interface and its applications may speak the users' language, with familiar phrases and words, instead of terms oriented to the system of the device or complicated technology details. Information presented by the interface appears in a natural and logical order. Information that is less relevant or rarely needed may not be presented in dialogue boxes or messages to the user.

SUMMARY

In an embodiment, a system is provided. The system comprises a processor, a memory, and a monitoring application stored in the memory, that, when executed by the processor, receives a first communication from a first portable electronic device containing a description of an ID of the first portable electronic device, the ID comprising automated installation components and an aggregated set of at least one of applications, media files, and widgets. The system also creates a file mirroring the ID and receives a second communication containing a first plurality of entries to the ID associated with interactions with at least a first remote device. The system also stores the first plurality of entries in the file and receives a third communication containing a first plurality of communications received by the first portable electronic device, the first plurality of communications associated with the interactions. The system also stores the first plurality of communications in the file and sends a fourth communication to a second remote device, the fourth communication providing the first plurality of entries and the first plurality of communications associated with the interactions.

In an embodiment, a processor-implemented method is provided. The method comprises an electronic device receiving a first communication, the first communication containing copies of short message service (SMS) communications exchanged between a first portable electronic device and a second portable electronic device during a first predetermined time period. The method also comprises the electronic device receiving a second communication, the second communication containing a description of telephone calls placed and received by a third portable electronic device during a second predetermined time period. The method also comprises the electronic device receiving a third communication, the third communication containing digital files associated with photographs taken by a fourth portable electronic device during a third predetermined time period. The method also comprises the electronic device presenting the first listing of the short message service (SMS) communications in a first panel of a display associated with the electronic device, presenting the description of telephone calls in a second panel of the display, and presenting a pictorial rendering of the digital files in a third panel of the display.

In an embodiment, a processor-implemented method is provided. The method also comprises a computer creating a file mirroring an ID of a first electronic device wherein the ID comprises automated installation components and an aggregated set of at least one of an application, a media file, and a widget wherein the first electronic device is a portable electronic device. The method also comprises the computer receiving a first communication from the first electronic device, the first communication describing at least one of a keystroke entry, a manual entry, and a voice entry into the first electronic device. The method also comprises the computer storing the contents of the first communication in the file. The method also comprises the computer sending a second communication to a second electronic device, the second communication describing the at least one of the keystroke entry, the manual entry, and the voice entry into the first electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
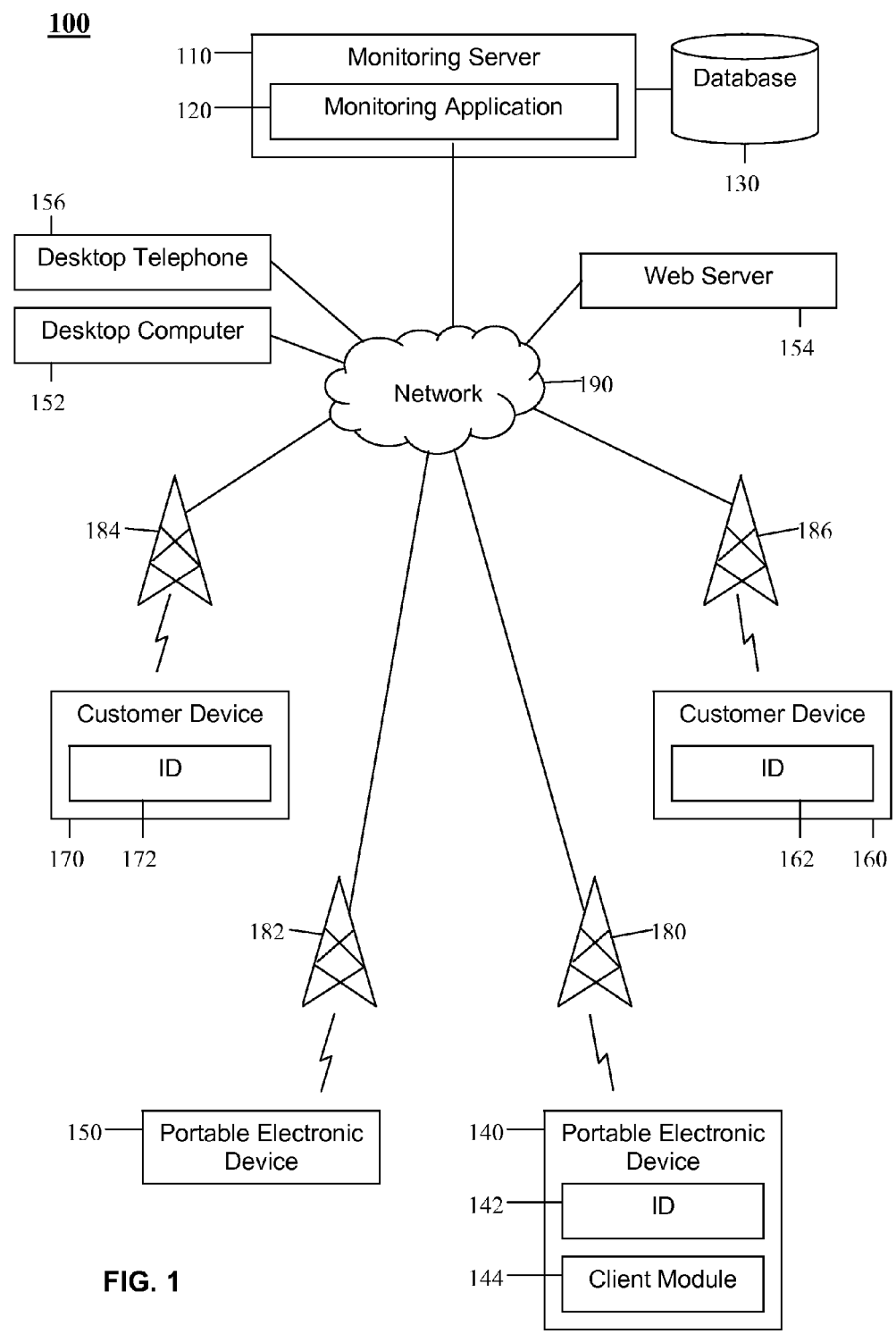
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure describes a system and methods that promote a telecommunications service provider or other organization to monitor and selectively capture and store entries made into a portable electronic device. The telecommunications service provider forwards the entries to a plurality of customers to view or otherwise experience. The entries are associated with ring tones, wallpapers, themes, and other settings entered into the portable electronic device. The system may also capture and forward transmissions received by the portable electronic device related to interactions of the device with other parties. The interactions may take place using short message service (SMS) or text messaging, electronic mail messaging, and internet browsing, for example. Customers of the telecommunications service provider receive the collections of entries, received transmissions, and other content using their own devices, for example portable electronic devices. The customer devices may load applications, media files, and web widgets used by the monitored portable electronic device as an ID. This may permit the customer devices to mimic or simulate the monitored portable electronic device and may allow users of customer devices to emulate and/or share some of the experiences of the user of the portable electronic device and adopt the user's preferences.

As used herein, an ID comprises one or more of applications, media files, and web widgets. An ID may further comprise installation logic that brings the applications, media files, and/or web widgets into service on an electronic device. In some cases, the applications, media files, and/or web widgets may be tested to confirm a standard amount of interoperability and/or compatibility. Thus, an ID comprises a unity which may be loaded, unloaded, cached, activated, deactivated as a group.

Celebrities, public figures, and other persons may use portable electronic devices, for example, mobile telephones, and take actions with their devices that are of interest to admirers or fans. The selection and configuration of portable electronic devices and their applications and other software may be viewed as statements or expressions of lifestyle preferences among some sectors of device users. A configuration for a ring tone or wallpaper, for example, made by the celebrity may be of interest to thousands or even millions of persons that admire the celebrity and are interested in and wish to emulate the celebrity's tastes and lifestyle choices. The admirers also wish to learn promptly about the celebrity's interactions with other persons, including other celebrities. The celebrity may enter into a commercial arrangement with the telecommunications service provider or other entity wherein the celebrity permits the provider to monitor, capture, and store some entries made by the celebrity into his or her portable electronic device. The provider creates files that mirror the celebrity's ID, including applications, media files, and widgets. The provider forwards these captured and stored entries to a plurality of its customers, for example fans and admirers of the celebrity, that subscribe to this service and wish to be kept informed on a timely basis of the celebrity's choices in device-related activities. The provider may also advise its subscribers of applications, media files, and web widgets used by the celebrity as his or her ID. The provider gives the subscribers a mechanism to download and install copies of this software that become components of IDs on the subscribers' devices. This may promote the subscribers to emulate the celebrity and enjoy the same experiences with their devices as enjoyed by the celebrity.

The system described herein additionally captures interactions of the celebrity with other devices and computers, for example text messaging and internet web site browsing and downloading. When the celebrity engages in text message interactions with selected other devices or browses some web sites, makes inquiries or postings, and downloads content, this information is provided to subscribing customers of the telecommunications service provider. Subscribing customers receive messages from the provider that describe text messaging between the monitored celebrity and another celebrity, for example, wherein both celebrities may provide authorization for this activity. Subscribing customers receive information about their favorite celebrities' web browsing of popular or trendy restaurant web sites. By installing and using one, some, or all of the applications, media files, and web widgets used by the monitored celebrity as an ID or portion of the celebrity's device interface, customers of the telecommunications service provider may stay current with many of the celebrity's preferences, choices, and interactions. The telecommunications service provider may generate revenues and user loyalty from such a commercial arrangement.

The telecommunications service provider may offer a similar service wherein a single customer may be provided information about the portable electronic device usage and movements of a plurality of users such as employees or children. While the usage of one device user, such as a celebrity, may be monitored, captured, and conveyed to a large quantity of admirers, one subscriber may alternatively receive information about portable electronic device usage by many users. The subscriber may concurrently view portable electronic device entries and interactions by the monitored users in tiled or cascaded panels of a monitor of a computer or interchangeable screens of a smaller device. This may allow a parent to selectively monitor the portable electronic device usage and associated actions of a child or may allow an employer to monitor the actions and movements of some field employees, such as drivers or sales people.

Turning now to FIG. 1, a system 100 is provided. The system 100 comprises a monitoring server 110, a monitoring application 120, a database 130, portable electronic devices 140, 150, customer devices 160, 170, base transceiver stations (BTS) 180, 182, 184, 186, and a network 190.

The monitoring server 110 is a computer system. Computer systems are described in detail hereinafter. The monitoring application 120 executes on the monitoring server 110. The monitoring application 120 receives a plurality of messages via the network 190 from the portable electronic device 140 containing information about some entries made into the portable electronic device 140 and its interactions with other devices, for example the portable electronic device 150 or a web server 154. The monitoring application 120 may store the information in the database 130 associated with the monitoring server 110 in files that mirror an ID 142 of the portable electronic device 140. The ID 142 comprises at least one of applications, media files, and widgets executing or resident on the portable electronic device 140. The monitoring application 120 sends the stored information to the customer devices 160, 170 that may comprise other portable electronic devices and desktop computers. These actions take place at the request of the customer devices 160, 170 and with the approval of the user of the monitored portable electronic device 140. The information captured from the portable electronic device 140 is transmitted to the customer devices 160, 170 in a manner that promotes the customer devices 160, 170 to simulate or mimic the portable electronic device 140 and in some embodiments replay its interactions with the portable electronic device 150. Users of the customer devices 160, 170 experience the interactions from the perspective of the user of the portable electronic device 140. The customer devices 160, 170 may load as their IDs 162, 172 some or all applications, media files, and widgets used by the portable electronic device 140 as its ID 142. These applications, media files, and widgets are used by the portable electronic device 140 for its ID 142 and may be adopted by the customer devices 160, 170 as their IDs 162, 172. This may be referred to as the IDs 162, 172 of the customer devices 160, 170 "mirroring" the ID 142 of the portable electronic device 140. This may further promote the customer devices 160, 170 to emulate or mimic the portable electronic device 140 in its configuration choices. This may also promote the users of the customer devices 160, 170 to enjoy learning of the interactions of the portable electronic device 140 with selected other devices, for example the portable electronic device 150, and perhaps emulate those interactions.

The basic functionality described herein comprises the monitoring application 120 causing the IDs 162, 172 of the customer devices 160, 170 to mirror the ID 142 of the portable electronic device 140. This is without regard to interactions of the portable electronic device 140 with external components such as the portable electronic device 150. In a simple embodiment, the ID 162 mirrors the ID 142. While embodiments described in detail hereinafter do provide for the capturing, storing, and forwarding of interactions of the portable electronic device 140 with others, a basic embodiment comprises the customer device 160 receiving information about the ID 142 of the portable electronic device 140 and updating its own ID 162 to mirror the ID 142. The components of the ID 142 that are mirrored by the ID 162 may comprise ring tones, wallpapers, themes, and other items associated with configuration choices made by the user of the portable electronic device 140. In such a basic embodiment, contents associated with interactions of the portable electronic device 140 with other devices are not part of content included in ID mirroring to the customer devices 160, 170. In this basic embodiment, transmissions received by the customer devices 160, 170 are limited to unilateral configuration changes and updates made by the user of the portable electronic device 140 to the ID 142. This basic embodiment does not involve participation by or interaction with outside components such as the portable electronic device 150.

In an embodiment, the entries into the portable electronic device 140 and messages received from the corresponding portable electronic device 150 that may comprise one or a series of interactions are provided to the customer devices 160, 170 under subscription or other commercial arrangements. The user of the portable electronic device 140 may be a celebrity, athlete, other public figure, or other person whose tastes, preferences, and interactions may be of interest to some individuals, groups, or other segments of the general public. The user's choices in ring tones, music, online videos, images or photographs taken and installed, web sites, icons, skins, and other objects and applications may be considered fashionable, trend-setting, or of interest for other reasons. A plurality of users of customer devices 160, 170 may wish to be provided this information about the user of the portable electronic device 140 and his or her various settings, choices, and communications. The user of the portable electronic device 140 authorizes release of this information on a limited basis under a contractual arrangement with a telecommunications service provider.

The telecommunications service provider or other organization may own, operate, or otherwise control the monitoring server 110 and provide the services described herein to a plurality of subscribers that are users of the customer devices 160, 170. The customer devices 160, 170 may themselves be portable electronic devices or other devices such as desktop computers. The users of the customer devices 160, 170 that receive the services described herein may also have subscription arrangements with the telecommunications service provider for wireless voice and data services. With the approval of the user of the portable electronic device 140, the telecommunications service provider causes the monitoring application 120 to capture some keypad, voice, and other entries made by the user. In an embodiment, the keypad, voice, and other entries may be captured in other ways, for example by a component installed and executing on the portable electronic device 140 such as the client module 144, and transmitted to the monitoring server 110 under push, pull, or other arrangements that will be discussed in greater detail hereinafter. The monitoring application 120 stores the entries in the database 130 or elsewhere in files that mirror the ID 142 or collection of applications, media files, and widgets comprising elements of the user interface of the portable electronic device 140. The monitoring application 120 may also capture and store messages received by the portable electronic device 140 from other portable electronic devices 150 and other computers, such as the web server 154. The messages received by the portable electronic device 140 may be in reply to the entries made by the user of the portable electronic device 140, for example entries associated with text messaging, electronic mail messaging, or web browsing. In an embodiment, the monitoring application 120 stores the entries made by the portable electronic device 140 and the messages received by the portable electronic device 140 from the portable electronic device 150 or others in chronological order or in another manner. The entries may receive time stamps when made and may be arranged by the monitoring application 120 after capturing in accordance with their time stamps for transmission to the customer devices 160, 170. This promotes the sequence of entries and messages to be intelligible to the users of the customer devices 160, 170 that receive this content under subscription or other arrangements with the telecommunications service provider.

The telecommunications service provider may capture keypad entries related to configurations, outgoing messages, and incoming transmissions for selected celebrities, public figures, and other persons of interest that use the portable electronic device 140. Because the tastes, preferences, lifestyle choices, and activities of celebrities such as athletes and actors may be of intense interest to large portions of the general public, their portable electronic device configurations and usage as expressions of their lifestyles and personalities may be of value to fans and admirers that in this disclosure are users of the customer devices 160, 170. Interest in device usage, including communications, by celebrities may be particularly intense when the information may be captured by the monitoring application 120 and conveyed to the customer devices 160, 170 on a timely basis. Having fresh or late-breaking information about a popular athlete, actor, or other celebrity may be valuable to a user of the customer device 160, especially if the celebrity is considered to be a trend setter in fashion, style, or culture. Timely information, for example information captured and provided to customer devices 160, 170 within an hour or several hours of its entry or other occurrence, about text messaging, web searching, and other interactions by the celebrity that may involve other celebrities or provide information about activities considered fashionable may also be of intense interest to users of customer devices 160, 170. By learning the ring tones, wallpaper choices, and themes of choice of one or several of a person's favorite celebrities, the person may emulate the celebrity. This may extend to products and services chosen by the celebrity. The telecommunications service provider may establish marketing and business alliances with manufacturers and vendors of products chosen by celebrities wherein fans and other admirers follow suit and purchase large amounts of these products. The telecommunications service provider may derive financial benefit from assisting in creating associations of celebrities and chosen products in the minds of many members of the general public that may then patronize these products.

The portable electronic device 140 is one of a mobile telephone, media player, or personal digital assistant (PDA) used by a celebrity or other person of interest. The portable electronic device 140 may also be a notebook computer, tablet computer, or an electronic device designed for the purpose of reading digital books and periodicals that uses e-ink technology to display content to readers. The celebrity may contract to allow the telecommunications service provider to monitor, capture, and forward some of the celebrity's entries into the portable electronic device 140. In an embodiment, the celebrity may contract with the telecommunications service provider such that only entries regarding configurations and settings of the portable electronic device 140 by the celebrity are captured and forwarded. This information alone may be valuable to a plurality of users of customer devices 160, 170 that consider nearly any activity by the celebrity to be of interest. While this limited embodiment may involve capturing, storing, and forwarding entries by the celebrity to the portable electronic device 140 that are largely unilateral in nature, these entries may be associated with applications, media files, and widgets installed on the portable electronic device 140 comprising its ID 142. The capturing of entries made to the portable electronic device 140 may be done on a periodic basis, such as hourly or daily, or may take place on an event-driven basis, wherein a message encapsulating information about the entries is transmitted to the monitoring server 110 upon the occurrence of a predefined event. This is discussed in greater detail hereinafter. When customer devices 160, 170 receive transmissions from the telecommunications service provider that contain captured entries made by the celebrity, the customer devices 160, 170 may also load and use the same applications, media files, and widgets used by the portable electronic device 140 to show, play, or otherwise display the entries and emulate the celebrity. The ID 142 of the celebrity may be adopted by a plurality of users of the customer devices 160, 170 as their IDs 162, 172. When the celebrity loads a new ring tone on his or her portable electronic device 140, the plurality of users of the customer devices 160, 170 interested in the celebrity may learn of this new ring tone and install it with little delay. In an embodiment, users of the customer devices 160, 170 may authorize installation of the new ring tone and other content captured from the portable electronic device 140 on an automatic basis such that the captured content is installed on the customer devices 160, 170 into the IDs 162, 172 without first securing the authorization of the users of the customer devices 160, 170.

In an embodiment, when the portable electronic device 140 is initially acquired by the user and activated for service, the portable electronic device 140 may not have applications, media files, and/or widgets immediately available for user access. After self-activation for wireless services with the telecommunications service provider, the portable electronic device 140 may reboot and an application may execute on the portable electronic device 140 and provide access to a remote software repository. The software repository may be provided by the telecommunications service provider and contains a selection of customized bundles of applications, media files, and/or widgets that may be precertified and trusted. The bundles become the ID 142 when installed on the portable electronic device 140. The selected bundle is downloaded to the portable electronic device 140 and installed by a custom toolset comprising a software installer included with the bundle. The installation may take place automatically without user action. The chosen applications, media files, and/or widgets comprising the ID 142 are installed and automatically configured. In an embodiment, one or more of the applications, media files, widgets, or other components of the ID 142 provide user interfaces that may, for example make available controls for user navigation and entry of choices. For example, an application loaded as a component of the ID 142 may be an internet web link to a restaurant locator web site. The application may provide an interface with controls allowing the user of the portable electronic device 140 to navigate about the restaurant locator and make selections regarding restaurant reservations and driving directions to the restaurant.

The ID 142 comprises more than individual applications, media files, and widgets for deployment on the portable electronic device 140. The bundles that contain the applications, media files, and/or widgets also contain the software installer that invokes routines or scripts that cause the applications, media files, and/or widgets to be installed in an automated and pre-tested fashion. This alleviates the installation process of requesting user intervention, for example making manual selections or restarting the portable electronic device 140. The routines or scripts invoked by the software installer are tested before being built into the bundles to assure that the applications, media files, and/or widgets install smoothly without intervention. The applications, media files, and/or widgets themselves are also tested before inclusion in the bundles and determined to be functioning as designed and free or viruses and other malicious elements.

Similar to the initial installation of the ID 142 on the portable electronic device 140, other IDs may be loaded, unloaded, cached, and reloaded at subsequent times and under specific conditions, such as when the portable electronic device 140 is detected to enter a particular location, for example a retail store or an entertainment venue. While the initial set of applications, media files, and/or widgets associated with the ID 142 obtained from the telecommunications service provider may comprise portions of a default ID, other IDs may be loaded with the user's approval and substitute for the applications, media files, and/or widgets associated with the default ID. When the portable electronic device 140 is detected to enter a retail store by technology located at the retail store, for example, Wi-Fi functionality of the portable electronic device 140 may be turned on, and an ID associated with the retail store may be temporarily loaded on the portable electronic device 140. The retail store's ID may comprise applications, media files, and/or widgets providing a floor map of the retail store, in-store radio providing music and announcements of promotions, and special messages to the portable electronic device 140 based on previous shopping behavior by the user. When the portable electronic device 140 exits the retail store, the store's ID may be unloaded, and the previous ID 142 may be reloaded.

In an embodiment, the ID 142 and other IDs may be fully or partially cached in the portable electronic device 140 when they are unloaded or deactivated upon the entry of the retail store or other premises that provide their own customized IDs. For example, the ID 142 may be a default ID for the portable electronic device 140. When the portable electronic device 140 enters the retail establishment as described above, the ID 142 is replaced by the ID of the retail establishment but is fully or partially cached in storage of the portable electronic device 140 and is therefore not deleted. This is in anticipation of the portable electronic device 140 exiting the retail establishment, the ID of the retail establishment being removed, and the default ID 142 being restored. It may be technically and economically unfeasible for the default ID 142 to be completely deleted and reinstalled each time the portable electronic device 140 enters and later exits the retail establishment. While the default ID 142 is deactivated and unloaded, it is not deleted, rather fully or partially cached in anticipation of its being reloaded upon exit of the portable electronic device 140 from the retail establishment. When the default ID 142 is partially cached, the portions of the default ID 142 that are not cached, and therefore may need to be located and downloaded again, are obtained from content servers associated with the monitoring server 110, the database 130, or from other sources.

For further details about IDs and loading IDs see U.S. patent application Ser. No. 12/876,220, filed Sep. 6, 2010, entitled "Provisioning System and Methods for Interfaceless Phone" by Jason R. Delker, et al., and U.S. patent application Ser. No. 12/876,221, filed Sep. 6, 2010, entitled "Dynamic Loading/Unloading/Caching of Alternate Complete Interfaces" by Jason Delker, et al., which are herein incorporated by reference.

The portable electronic device 140 comprises the client module 144 that assists in capturing some entries by the celebrity into the portable electronic device 140. While the celebrity may contract with the telecommunications service provider permitting the capturing and forwarding of some entries into the portable electronic device 140, the celebrity may not allow the capturing of all entries. The celebrity may wish that aspects of his or her activities regarding the portable electronic device 140 are not to be made public. The client module 144 installs in the portable electronic device 140 when the celebrity agrees with the telecommunications service provider to allow capturing of entries as described herein. The client module 144 works in concert with the monitoring application 120 executing on the monitoring server 110. The identification, capturing, and movement of digital content to the monitoring server 110 may be done in part by the client module 144. The client module 144 may work with the monitoring application 120 in enforcing policies about the types of entries to capture from the portable electronic device 140 and protecting the privacy of the celebrity or other user of the portable electronic device 140. The privacy of the celebrity as well as the privacy of users of the portable electronic device 150 with whom the celebrity communicates may be contractually guaranteed by the telecommunications service provider.

In an embodiment, choices associated with entries to applications, media files, and/or widgets that may be monitored by the monitoring application 120 are be entered by the user of the portable electronic device 140. The user may also configure selections about the interactions with the portable electronic device 150 and other devices that the monitoring application 120 may capture, store, and forward as described herein. The telecommunications service provider may request the user of the portable electronic device 140 to make the selections associated with entries and interactions eligible for capturing, storing, and forwarding. This may protect the telecommunications service provider from liability arising from errors associated with customer devices 160, 170 receiving content that the user of the portable electronic device 140 does not wish to be released. This may permit the telecommunications service provider to disclaim legal responsibility any such errors. The user of the portable electronic device 140 may make these selections using the client module 144 executing on the portable electronic device 140

The portable electronic device 150 is used by individuals with whom the portable electronic device 140 used by the celebrity may have interactions such as text messaging, instant messaging, and electronic mail messaging. While one embodiment described herein may be limited to the capturing of some entries made by the celebrity into the portable electronic device 140 associated with primarily unilateral activities, the present disclosure also teaches capturing, storing, and forwarding some messages received by the portable electronic device 140 from other devices. The portable electronic device 150 is used by another celebrity, a family member, a friend, a business associate, or other person that communicates with the portable electronic device 140. The user of the portable electronic device 150 may authorize when some of its interactions with the portable electronic device 140 used by the celebrity are captured, stored, and forwarded to customer devices 160, 170 under the business arrangement described herein. The telecommunications service provider takes steps to protect the privacy rights of the user of the portable electronic device 150 as it does to protect those rights of the celebrity or other user of the portable electronic device 140. The user of the portable electronic device 150 may additionally share in some of the compensation received, if any, by the celebrity or other user of the portable electronic device 140 under these arrangements.

The communications by the portable electronic device 140 with other devices, for example the portable electronic device 150, may be of significant interest to users of the customer devices 160, 170. As noted, these communications comprise all or portions of text messaging, instant messaging, electronic mail messaging, and other messaging between the portable electronic device 140 and the portable electronic device 150. The present disclosure also describes capturing entries and received messages associated with web browsing and other interactions wherein the celebrity or other individual using the portable electronic device 140 may not be communicating directly with another human user. Web browsing by the portable electronic device 140 may be of interest to a large body of fans or other followers of the celebrity. The celebrity may be downloading music from or playing music streamed by the web server 154. The celebrity may be engaging in similar actions with video content stored by the web server 154 or another device. The celebrity may be browsing web sites associated with restaurants, nightclubs, resorts, or other venues or subjects considered trendy. The celebrity's tastes in music, video, food, art, and style may be subjects of broad public curiosity. The celebrity may have loaded a web widget that provides a stream of content to the portable electronic device 140 containing music, commentary, or other digital material. The celebrity may have accessed a network service using the portable electronic device 140. The users of the customer devices 160, 170 may eagerly subscribe to receive information about these subjects from the telecommunications service provider.

The desktop computer 152 and the desktop telephone 156 may be used by individuals with whom the celebrity or other user of the portable electronic device 140 communicates wherein the interactions are captured, stored, and forwarded by the monitoring application 120. The desktop computer 152 and the desktop telephone 156 may be used by the same person that uses the portable electronic device 150 to communicate with the portable electronic device 140. The portable electronic device 140 may receive instant messages or electronic mail messages from the desktop computer 152 that are captured and forwarded by the monitoring application 120 along with corresponding entries made by the portable electronic device 140. The portable electronic device 140 and the desktop telephone 156 also exchange messages of various kinds that are captured and forwarded by the monitoring application 120.

The customer devices 160, 170 are used by customers of the telecommunications service provider or other organization. The customer devices 160, 170 receive information about device entries and interactions by selected celebrities or other persons of interest using the portable electronic device 140. Users of the customer devices 160, 170 may be customers of the telecommunications service provider for a plurality of communications services including wireless voice and data services. The services described herein may be available to these customers under their subscription agreements with the telecommunications service provider. The customer devices 160, 170 may be portable electronic devices such as mobile telephones, media players, or personal digital assistants (PDA). The customer devices 160, 170 may also be desktop computers. While FIG. 1 depicts the customer devices 160, 170 communicating wirelessly via the base transceiver stations (BTS) 184, 186, it is understood that the customer devices 160, 170 in an embodiment are desktop computers or other devices with wired connections to the network 190 and the monitoring server 110.

In some cases, the portable electronic device 140 used by the celebrity and the customer devices 160, 170 may have hardware and/or software differences such that not all content captured from the portable electronic device 140 may be presented by the customer devices 160, 170 as experienced by the portable electronic device 140. The portable electronic device 140 may load at least one of applications, media files, and widgets as its ID 142 that one or more customer devices 160, 170 are unable to load fully or at all because of hardware or software limitations of the customer devices 160, 170. In an embodiment, the sources from which the portable electronic device 140 downloaded the application, media file, and/or widget in question may for a plurality of reasons not permit the portable electronic device 140 or telecommunications service provider to redistribute the application, media file, and/or widget or some of its content. In the embodiment, the customer devices 160, 170 may not receive some content that they might otherwise be entitled to receive for legal, technical, or other reasons. In an embodiment, the monitoring application 120 may adapt the applications, media files, and widgets associated with the ID 142 of the portable electronic device 140 to function acceptably on the customer devices 160, 170 so the users of the customer devices 160, 170 may enjoy the experience within legal, technical, or other requirements of the suppliers of the applications, media files, and widgets or associated content.

While the applications, media files, and widgets that comprise the ID 142 for the portable electronic device 140 are generally associated with installation and usage on mobile devices, the present disclosure additionally teaches that the customer devices 160, 170 may be desktop computers. A user of the customer device 160 that is a mobile telephone may wish to enjoy content accessed and received by the portable electronic device 140 on his or her desktop computer while at work at the user's office or on a home desktop computer. Because the applications, media files, and widgets are mobile device software components and IDs are generally associated with mobile devices, the monitoring application 120 may adapt the application, media file, and/or widget needed by the customer device 160, 170 that is a desktop computer so that the application, media file, and/or widget functions acceptably on that platform. In an embodiment, to accommodate a desktop computer or other device with technical limitations, the monitoring application 120 may provide only an image of the application, media file, and/or widget executing. It may appear that the application, media file, and/or widget has been installed on the customer devices 160, 170 whereas instead the application, media file, and/or widget has been installed elsewhere by the monitoring application 120 and the monitoring application 120 is streaming the content to the customer devices 160, 170. The customer devices 160, 170 may not be aware that this exceptional handling by the monitoring application 120 is taking place to compensate for the hardware, software, or other shortcomings of the customer devices 160, 170.

The monitoring application 120 works with the client module 144 executing on the portable electronic device 140 to capture the entries made by the celebrity or other user as well as messages received by the portable electronic device 140 from the portable electronic device 150, the desktop computer 152, the web server 154, and the desktop telephone 156. The captured digital content may be pushed by the portable electronic device 140 to the monitoring server 110, pulled by the monitoring server 110 from the portable electronic device 140, or some combination. Once the captured digital content is stored by the monitoring server 110 in the database 130 or elsewhere, the monitoring application 120 arranges the digital content so that it plays, renders, or otherwise displays or is viewable and/or audible using the at least one appropriate application, media file, and/or widget executing on the customer device 160, 170. If the customer device 160 does not have the appropriate application, media file, and/or widget in its ID 162 that the customer device 160 needs to display or play the content, the monitoring server 110 sends it to the customer device 160 along with the content.

The monitoring application 120 may send captured and stored content to the customer devices 160, 170 immediately on receipt from the portable electronic device 140 on a real-time basis, may send it to the customer devices 160, 170 on a delayed basis, or may not do so until specifically requested by the customer devices 160, 170. The customer devices 160, 170 may use bookmarks or other tools to access web sites or other locations where the content is available. As with movement of captured data from the portable electronic device 140 to the monitoring server 110, the delivery of captured content from the monitoring server 110 to the customer devices 160, 170 may take place on a pushed basis, a pulled basis, a combination of the two bases, or in another manner.

The discussion herein has been based to this point on the monitoring server 110, possibly controlled by the telecommunications service provider, capturing digital content from the portable electronic device 140 and forwarding the content to the customer devices 160, 170 that may be large in number. Embodiments and scenarios described herein have been based on one or few content-generating and/or content-consuming devices, such as the portable electronic device 140, transmitting the content via the monitoring server 110 to many passive observing devices, such as the customer devices 160, 170. The functionality of the monitoring server 110 and the monitoring application 120 may be used in other embodiments wherein a single device, for example a customer device 160, 170, monitors a plurality of portable electronic devices 140. In this other embodiment, the customer device 160 may be used by a manager monitoring a plurality of portable electronic devices 140 used by employees or by a parent monitoring a plurality of portable electronic devices 140 used by children. In this other embodiment, the customer device 160 may be a desktop computer that may simultaneously display a plurality of panels in a tiled or cascaded fashion that depict the ID 142 of the monitored portable electronic device 140. The panels displayed on the monitor of the customer device 160 may depict applications, media files, and widgets used by the portable electronic devices 140. When one of the portable electronic devices 140 begins to use an application, media file, and/or widget that the customer device 160 presently does not have installed, the monitoring application 120 may send the application, media file, and/or widget to the customer device 160 for its installation.

The monitoring application 120 performs the same or similar actions in this other embodiment as it does in the embodiments described previously in greater detail. The monitoring application 120 identifies, captures, and stores selected entries and messages associated with interactions by portable electronic devices 140 and forwards them to the customer device 160. The roles, motivations, and types of control of the parties using the portable electronic devices 140 and the customer devices 160 described in this other embodiment may differ from those described in the more extensively described embodiments that use celebrities and large quantities of admirers as example participants.

Continuing discussion of the other embodiment, a parent of several children may monitor mobile device usage by the children, including text message activity, web search activity, chat room activity, and physical movement of the mobile devices. The parent may view panels on the customer device 160 that are simultaneously displayed that simulate the IDs 142 of the portable electronic devices 140 carried by the children. A manager may similarly view simultaneously the device usage of a plurality of employees carrying the portable electronic devices 140. These may be field employees such as sales people or drivers of delivery vehicles, for example. The parent or manager described herein may request the telecommunications service provider to configure its service on an exception-type basis such that the parent may be alerted when the child is exchanging text messages with a particular telephone number or sales people or drivers are detected to be traveling to locations outside of their assigned territories or their portable electronic devices 140 are detected to not be moving at all.

Figure 2:
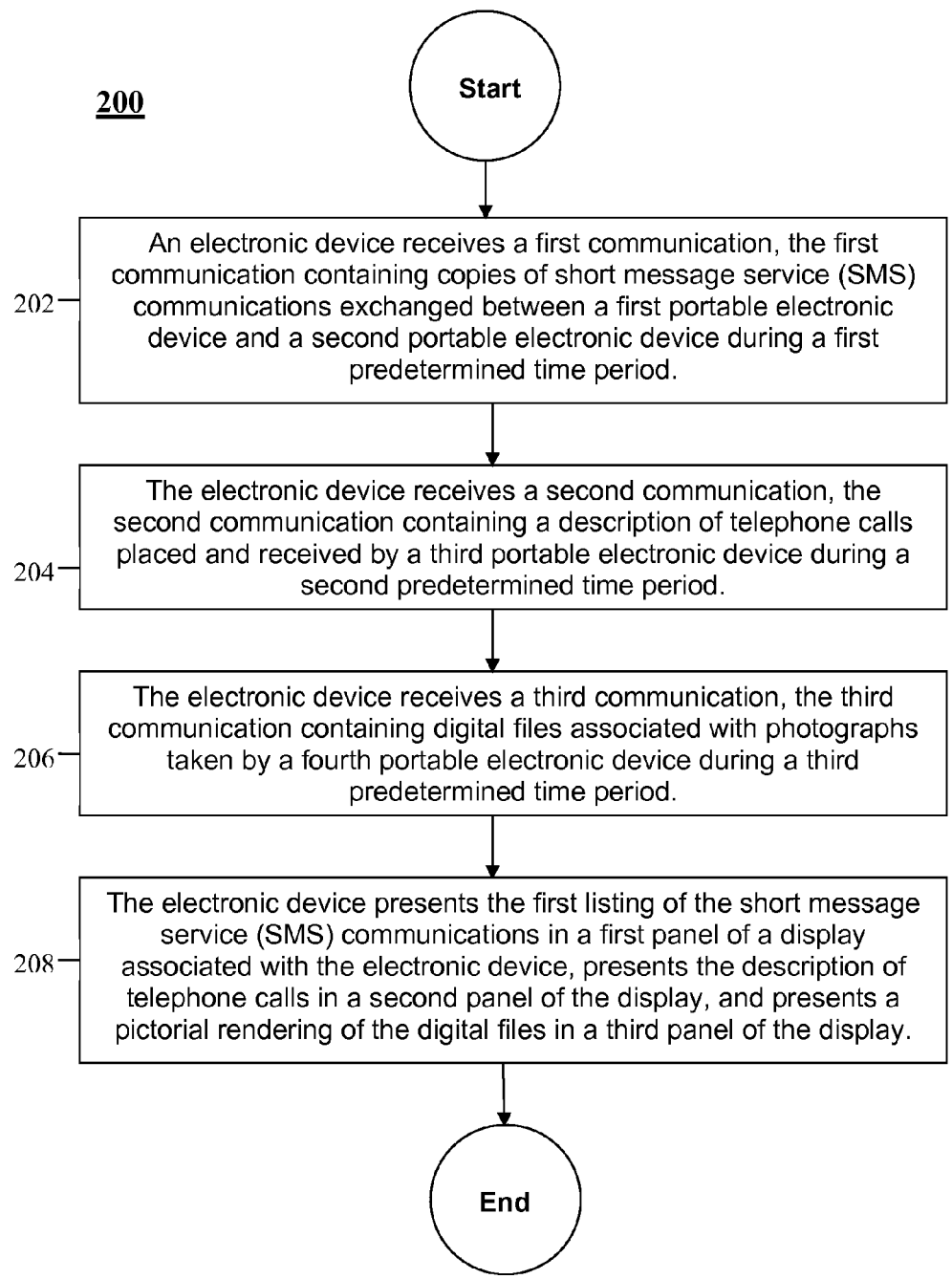
FIG. 2 is a flow chart illustrating a method according to an embodiment of the disclosure.

Turning now to FIG. 2, a processor-implemented method 200 is described. Beginning at block 202, an electronic device receives a first communication, the first communication containing copies of short message service (SMS) communications exchanged between a first portable electronic device and a second portable electronic device during a first predetermined time period. At block 204, the electronic device receives a second communication, the second communication containing a description of telephone calls placed and received by a third portable electronic device during a second predetermined time period. A communication may be contained in an electronic mail message or may be contained in a data packet. A communication may be contained in an instant messaging (IM) message or in a multimedia messaging service (MMS) message. A communication could be an interprocess communication (IPC) message. A communication could be an application programming interface function invocation with the communication content provided as a parameter to the application programming interface function invocation.

At block 206, the electronic device receives a third communication, the third communication containing digital files associated with photographs taken by a fourth portable electronic device during a third predetermined time period. At block 208, the electronic device presents the first listing of the short message service (SMS) communications in a first panel of a display associated with the electronic device, presents the description of telephone calls in a second panel of the display, and presents a pictorial rendering of the digital files in a third panel of the display.

The base transceiver stations 180, 182, 184, 186 may be any of a cellular wireless base transceiver station, for example a Code Division Multiple Access (CDMA), Global System for Mobile Communications (GSM), Universal Mobile Communications System (UMTS), and/or Long-term Evolution (LTE) cellular wireless base transceiver station; a World-wide Interoperable Microwave Access (WiMAX) base transceiver station; a WiFi access point; a femtocell; or other wireless access devices. While FIG. 1 depicts each of the portable electronic devices 140, 150 and the customer devices 160, 170 individually transmitting via the base transceiver stations 180, 182, 184, 186, respectively, in an embodiment, because the portable electronic devices 140, 150 and the customer devices 160, 170 are mobile, they may transmit via any of the base transceiver stations 180, 182, 184, 186 in a plurality of combinations.

The network 190 promotes communication between the components of the system 100. The network 190 may be any communication network including a public data network (PDN), a public switched telephone network (PSTN), a private network, and/or a combination thereof.

Figure 3:
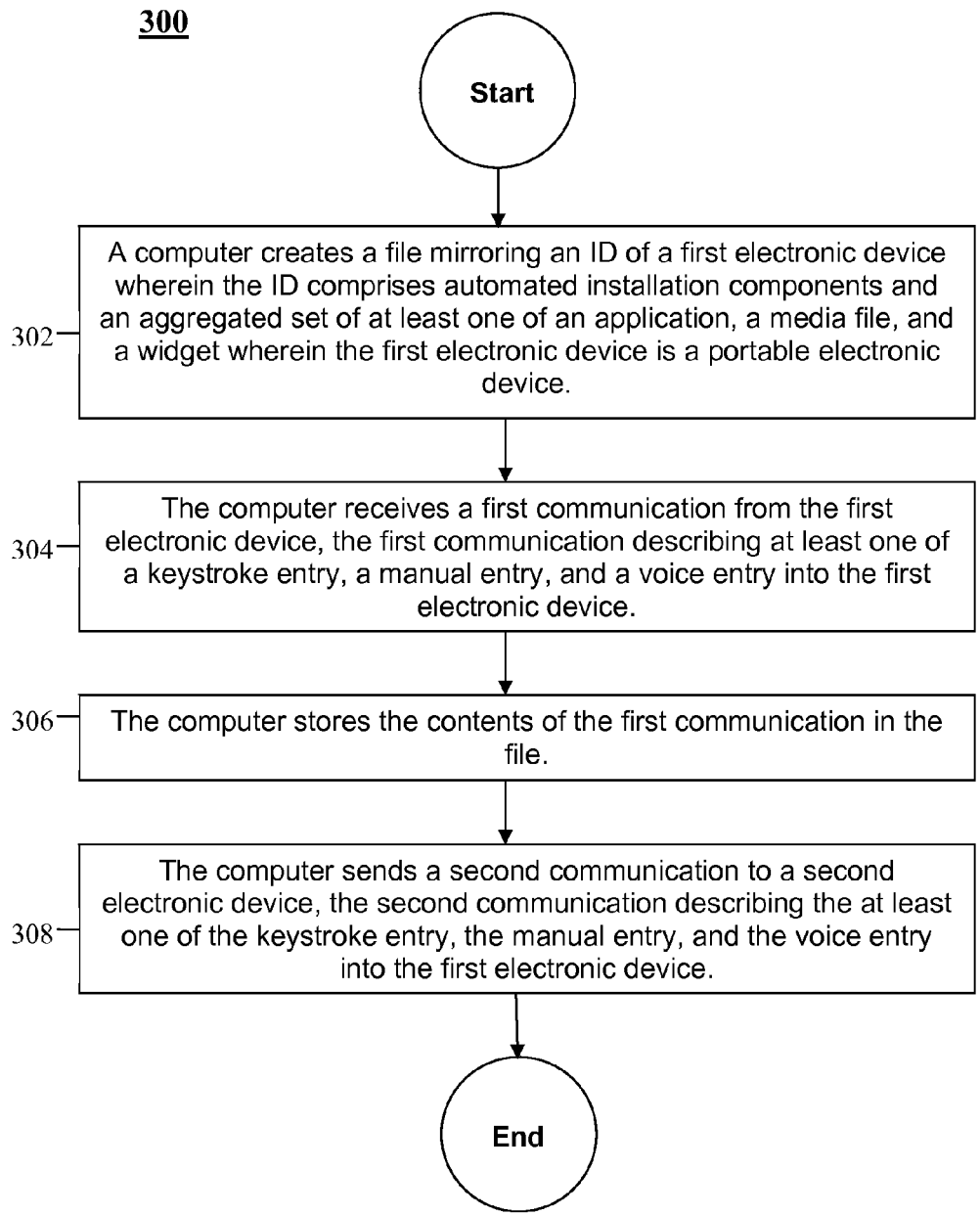
FIG. 3 is a flow chart illustrating a method according to an embodiment of the disclosure.

Turning now to FIG. 3, a processor-implemented method 300 is described. Beginning at block 302, a computer creates a file mirroring an ID of a first electronic device wherein the ID comprises automated installation components and an aggregated set of at least one of an application, a media file, and a widget wherein the first electronic device is a portable electronic device. At block 304, the computer receives a first communication from the first electronic device, the first communication describing at least one of a keystroke entry, a manual entry, and a voice entry into the first electronic device.

At block 306, the computer stores the contents of the first communication in the file. At block 308, the computer sends a second communication to a second electronic device, the second communication describing the at least one of the keystroke entry, the manual entry, and the voice entry into the first electronic device. In an embodiment, the computer sends the file containing a mirrored ID 142 of the portable electronic device 140 without sending the second communication.

Figure 4:
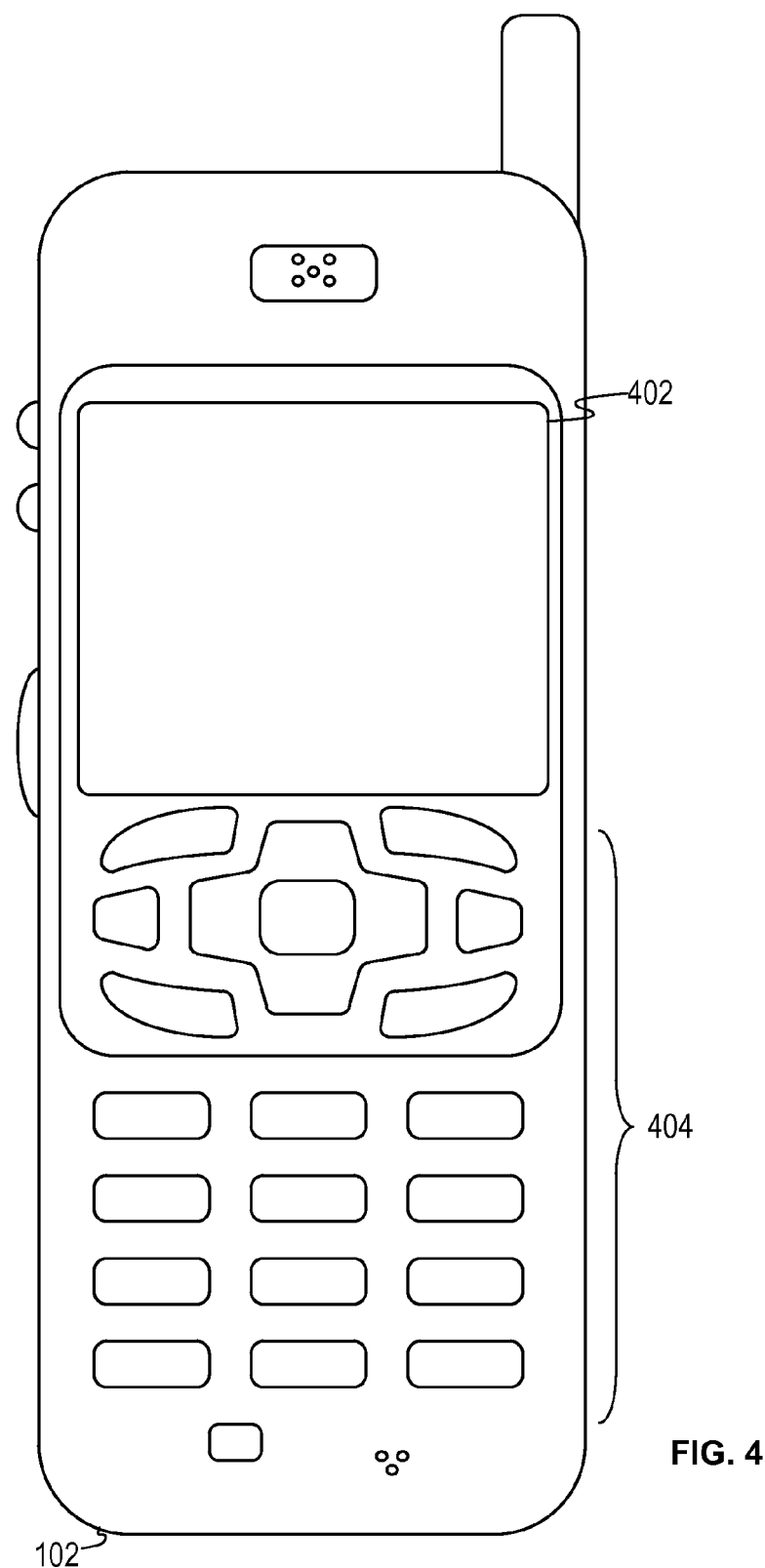
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 may in some embodiments exemplify the portable electronic devices 140, 150 and the customer devices 160, 170 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with base transceiver stations (BTS) 180, 182, 184, 186, a wireless network access node, a peer mobile device 102 or any other wireless communication network or system. While a plurality of base transceiver stations (BTS) 180, 182, 184, 186 are illustrated in FIG. 1, it is understood that the wireless communication system may comprise a single base transceiver stations (BTS) 180. In some instances, the mobile device 102 may be in communication with multiple base transceiver stations (BTS) 180, 182, 184, 186 at the same time. The base transceiver stations (BTS) 180, 182, 184, 186 (or wireless network access node) is coupled to a wired network 190, such as the Internet. Via the wireless link and the wired network, the mobile device 102 has access to information on various servers that may provide content that may be shown on the display 402. Alternately, the mobile device 102 may access the base transceiver stations (BTS) 180, 182, 184, 186 through a peer mobile device 102 acting as an intermediary, in a relay type or hop type of connection.

Figure 5:
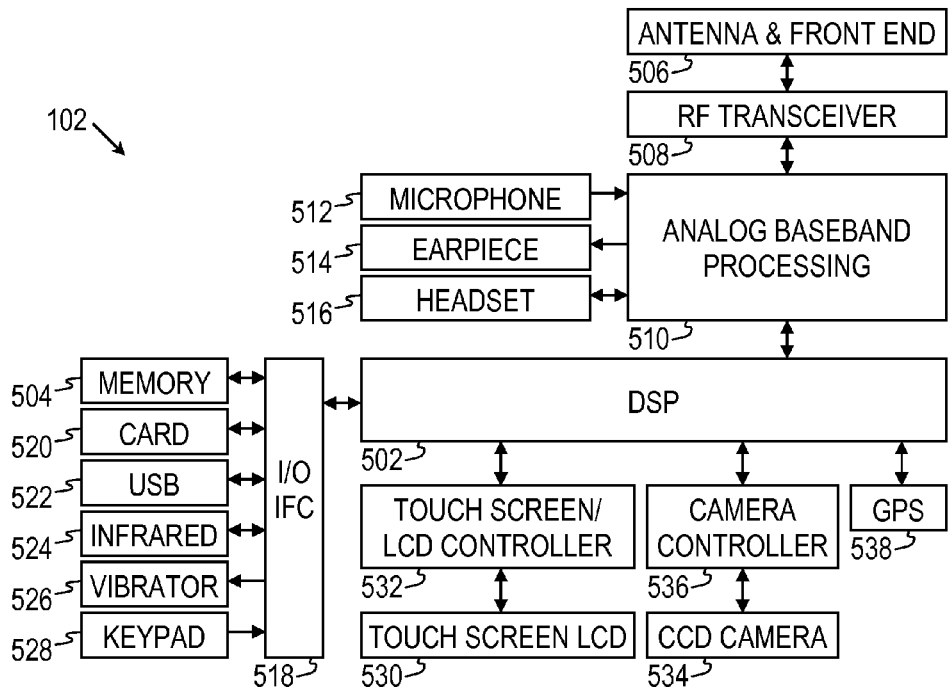
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
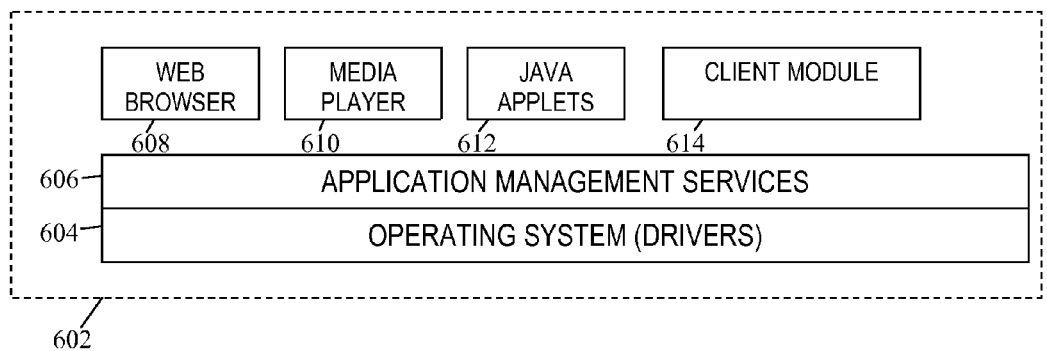
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The client module 614 may correspond to the client module 144 installed in the portable electronic device 140 provided by the system 100. The client module 614 may not be installed in all instances of the mobile device 102.

Figure 7:
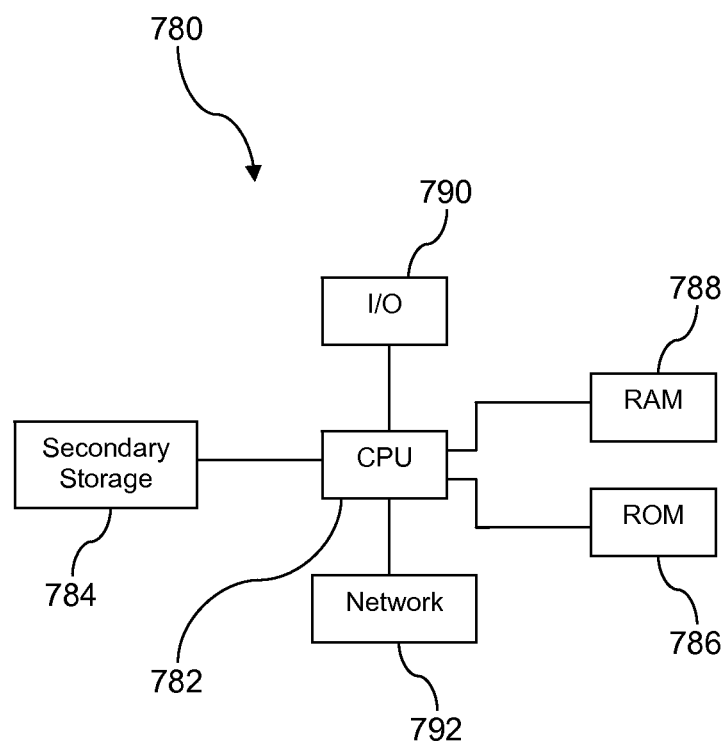
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, a baseband signal and/or a signal embodied in a carrier wave may be referred to as a transitory signal. In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for content sharing between a celebrity monitored portable electronic device and one or more fan subscriber portable electronic devices, comprising:
   a processor of a monitoring server;
   a memory of the monitoring server; and
   a monitoring application stored in the memory of the monitoring server and connected by a network to the celebrity monitored portable electronic device and the one or more fan subscriber portable electronic devices, that, when executed by the processor,
      receives an interface pack description communication from the celebrity monitored portable electronic device containing a description of an interface pack of the celebrity monitored electronic device, the interface pack comprising automated installation components and an aggregated set of a plurality of an application, a media file, and a widget,
      creates a file mirroring the interface pack,
      sends the interface pack of the celebrity monitored electronic device to the one or more fan subscriber portable electronic devices, wherein the interface pack and the file mirroring the interface pack allow the one or more fan subscriber portable electronic devices to simulate the celebrity monitored portable electronic device,
      receives an interface pack associated communication containing a plurality of entries to the interface pack associated with interactions by the celebrity monitored portable electronic device, wherein the plurality of entries to the interface pack associated with interactions comprises at least one of a first keystroke entry, a manual entry, or a voice entry associated with a changing of a ring tone, a playing of at least one of an audio or video file, a setting of a theme by the celebrity monitored portable electronic device, a taken or installed image or photograph, a text message, an electronic mail message, or web browsing,
      stores the plurality of entries in the file,
      receives an interaction history communication containing a plurality of communications received by the celebrity monitored portable electronic device from one or more authorized electronic devices, the plurality of communications associated with at least some of the interactions,
      stores the plurality of communications in the file, and
      sends a communication to the one or more fan subscriber portable electronic devices, the communication providing the plurality of entries and the plurality of communications associated with the interactions from the file, wherein the one or more fan subscriber portable electronic devices simulate the celebrity monitored portable electronic device by integrating the plurality of entries and the plurality of communications with the received interface pack.

2. The system of claim 1, wherein the communication provides the plurality of entries and the plurality of communications associated with the interactions in chronological order.

3. The system of claim 2, wherein receiving the plurality of entries and the plurality of communications in chronological order promotes the one or more fan subscriber portable electronic devices replaying the interactions in a manner understandable by a user of the one or more fan subscriber portable electronic devices.

4. The system of claim 3, wherein the one or more fan subscriber portable electronic devices replay the interactions using at least one application, media file, or widget used by the celebrity monitored portable electronic device to make the entries and receive the plurality of communications, promoting the one or more fan subscriber portable electronic devices to simulate the interactions from a perspective of the celebrity monitored portable electronic device, and further promoting a user of the one or more fan subscriber portable electronic devices to one of emulate and share at least one experience of a user of the celebrity monitored portable electronic device and adopt at least one preference of the user of the celebrity monitored portable electronic device.

5. The system of claim 2, wherein the interaction history communication additionally comprises instructions regarding at least one application, media file, or widget executing on the one or more fan subscriber portable electronic devices to use in replaying the interactions.

6. The system of claim 1, wherein when at least one application, media file, or widget used to replay the interactions is not installed on the one or more fan subscriber portable electronic devices, the communication additionally contains the at least one application, media file, or widget.

7. The system of claim 1, wherein the communication is sent on a real-time basis.

8. The system of claim 1, wherein the communication is additionally sent to other fan subscriber portable electronic devices.

9. The system of claim 1, wherein the one or more fan subscriber portable electronic devices temporarily or permanently install the plurality of the application, the media file, and the widget used by the celebrity monitored portable electronic device to simulate the interface pack used by the celebrity monitored portable electronic device.

10. The system of claim 1, wherein the monitoring application promotes the one or more fan subscriber portable electronic devices to observe short message service (SMS) messages, electronic mail messages, web search transmissions, and internet telephone messages exchanged by the celebrity monitored portable electronic device with the one or more authorized electronic devices.

11. The system of claim 1, wherein the plurality of communications received by the celebrity monitored portable electronic device from the one or more authorized electronic devices comprises short message service communications.

12. The system of claim 11, wherein the plurality of communications received by the celebrity monitored portable electronic device from the one or more authorized electronic devices further comprises a description of telephone calls placed and received by the celebrity monitored portable electronic device.

13. The system of claim 12, wherein the plurality of communications received by the celebrity monitored portable electronic device from the one or more authorized electronic devices further comprises digital files associated with photographs taken by the celebrity monitored portable electronic device.

14. The system of claim 13, wherein the one or more fan subscriber portable electronic devices present the short message service communications in a first panel of a display associated with the one or more fan subscriber portable electronic devices, the description of telephone calls in a second panel of the display, and a pictorial rendering of the digital files in a third panel of the display.

15. The system of claim 14, wherein the first panel, the second panel, and the third panel are presented separately or arranged simultaneously in the display in a tiled fashion or a cascaded fashion.

16. The system of claim 1, wherein the monitoring application sends the communication to the one or more fan subscriber portable electronic devices on a near-real time basis or a delayed basis at the request of the one or more fan subscriber portable electronic devices.

17. The system of claim 1, wherein the file mirroring the interface pack comprises components of the interface pack, and wherein the components of the interface pack comprise one or more of a ring tone, a wallpaper, a theme, or a user interface configuration choice made by a user of the celebrity monitored portable electronic device.

18. The system of claim 17, wherein the monitoring application further receives a change to one or more of the ring tone, the wallpaper, the theme, or the user interface configuration choice from the celebrity monitored portable electronic device, stores the change to the file, and sends the change from the file to the one or more fan subscriber portable electronic devices.

* * * * *